(12) United States Patent
Beverley et al.

(10) Patent No.: US 7,108,479 B2
(45) Date of Patent: Sep. 19, 2006

(54) METHODS AND APPARATUS FOR SUPPLYING COOLING FLUID TO TURBINE NOZZLES

(75) Inventors: Michael Beverley, West Chester, OH (US); Darek Zatorski, Florence, KY (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/465,328

(22) Filed: Jun. 19, 2003

(65) Prior Publication Data

US 2004/0258516 A1    Dec. 23, 2004

(51) Int. Cl.
*F01D 5/14* (2006.01)
*F03B 11/00* (2006.01)
*F04D 29/38* (2006.01)

(52) U.S. Cl. .................. 415/115; 415/144; 415/191
(58) Field of Classification Search ............... 415/115, 415/144, 191
See application file for complete search history.

(56) References Cited

U.S. PATENT DOCUMENTS

| | | | |
|---|---|---|---|
| 2,896,906 A * | 7/1959 | Durkin ................... 415/115 |
| 4,126,405 A | 11/1978 | Bobo et al. |
| 4,251,185 A | 2/1981 | Karstensen |
| 4,492,517 A | 1/1985 | Klompas |
| 4,551,064 A * | 11/1985 | Pask ..................... 415/115 |
| 5,165,847 A * | 11/1992 | Proctor et al. .......... 415/115 |
| 5,197,852 A | 3/1993 | Walker et al. |
| 5,224,818 A * | 7/1993 | Drerup et al. .......... 415/115 |
| 5,964,575 A * | 10/1999 | Marey .................. 415/115 |
| 6,726,446 B1 * | 4/2004 | Arilla et al. ............ 415/138 |

FOREIGN PATENT DOCUMENTS

EP        515130 A1 *  11/1992

* cited by examiner

*Primary Examiner*—Theresa Trieu
(74) *Attorney, Agent, or Firm*—William Scott Andes; Armstrong Teasdale LLP

(57) ABSTRACT

A method enables a gas turbine engine to be operated. The method comprises supplying cooling fluid into a manifold ring that includes a plurality of distribution ports defined by a sidewall connected by a radially inner wall, channeling the cooling fluid circumferentially through the manifold ring and through at least one distribution port that is defined by a wall that extends arcuately across at least one turbine nozzle, and discharging cooling fluid from the distribution ports radially inwardly towards the at least one turbine nozzle positioned radially inward from the manifold ring.

17 Claims, 5 Drawing Sheets

METHODS AND APPARATUS FOR SUPPLYING COOLING FLUID TO TURBINE NOZZLES

BACKGROUND OF THE INVENTION

This invention relates generally to gas turbine engine nozzles and more particularly, to methods and apparatus for supplying cooling fluid to turbine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially. At least some known turbine nozzles include a plurality of circumferentially-spaced hollow airfoil vanes coupled by integrally-formed inner and outer band platforms. More specifically, the inner band forms a portion of the radially inner flowpath boundary and the outer band forms a portion of the radially outer flowpath boundary At least some known turbine nozzle airfoil vanes are hollow and include a cavity defined therein. At least some known airfoil vane cavities are partitioned into a leading edge cooling passage, a center passage, and a trailing edge passage. Cooling air is supplied to a manifold that extends circumferentially within the engine and around the turbine nozzle outer bands. The airflow is directed radially inwardly through a plurality of distribution ports that are formed integrally with the manifold. Specifically, the distribution ports are circumferentially-spaced about the manifold such to facilitate supplying cooling air to a respective turbine nozzle vane. More specifically, known distribution ports are defined by a substantially planar radially inner surface that extends across the port to an annular sidewall. To facilitate distributing the cooling airflow across the turbine nozzle airfoil vane cooling passages, known distribution ports include a plurality of openings that extend through the distribution port sidewall. Accordingly, the openings are oriented approximately ninety degrees from the distribution port radially inner surface.

During operation, airflow channeled to the distribution ports is forced radially inward towards the nozzle cavities through the distribution port openings. The airflow entering the distribution ports impinges against the radially inner surface of the ports and is changed in flow direction through the port openings. However, as the airflow changes flow direction, turbulence and pressure losses are generated. Moreover, the turbulence and pressure losses may adversely effect cooling airflow supplied to the airfoil vane cavity center cooling passage. Over time continued operation with decreased cooling of the center cooling passage, may limit a useful life of the turbine nozzle.

BRIEF SUMMARY OF THE INVENTION

In one aspect, a method for operating a gas turbine engine is provided. The method comprises supplying cooling fluid into a manifold ring that includes a plurality of distribution ports defined by a sidewall connected by a radially inner wall, channeling the cooling fluid circumferentially through the manifold ring past into at least one distribution port that is defined by a radially inner wall that extends arcuately across the distribution port, and discharging cooling fluid from the manifold ring radially inwardly towards a plurality of turbine nozzles positioned radially inward from the manifold ring.

In another aspect, a turbine nozzle assembly for a gas turbine engine is provided. The nozzle assembly includes a turbine nozzle, and a manifold ring. The turbine nozzle includes an outer band, an inner band, and plurality of airfoil vanes coupled together by the outer and inner bands. Each airfoil vane is hollow and defines a cavity therein. The manifold ring extends circumferentially around the turbine nozzle for channeling cooling fluid radially inwardly into each airfoil vane cavity. The manifold ring includes a radially outer wall and a radially inner wall coupled together by a pair of sidewalls. At least a portion of the radially inner wall extends arcuately between the pair of sidewalls.

In a further aspect, a gas turbine engine including a turbine nozzle assembly is provided. The turbine nozzle assembly includes at least one turbine nozzle, and a manifold ring. The at least one turbine nozzle includes an outer band, an inner band, and plurality of airfoil vanes coupled together by the outer and inner bands. Each of the airfoil vanes is hollow and defines a cavity therein. The manifold ring extends circumferentially within the gas turbine engine and is radially outward from the at least one turbine nozzle for channeling cooling fluid radially inward into each airfoil vane cavity. The manifold ring includes at least one distribution port defined by a radially inner wall that extends arcuately across the distribution port between a sidewall.

DETAILED DESCRIPTION OF THE INVENTION

Figure 1:
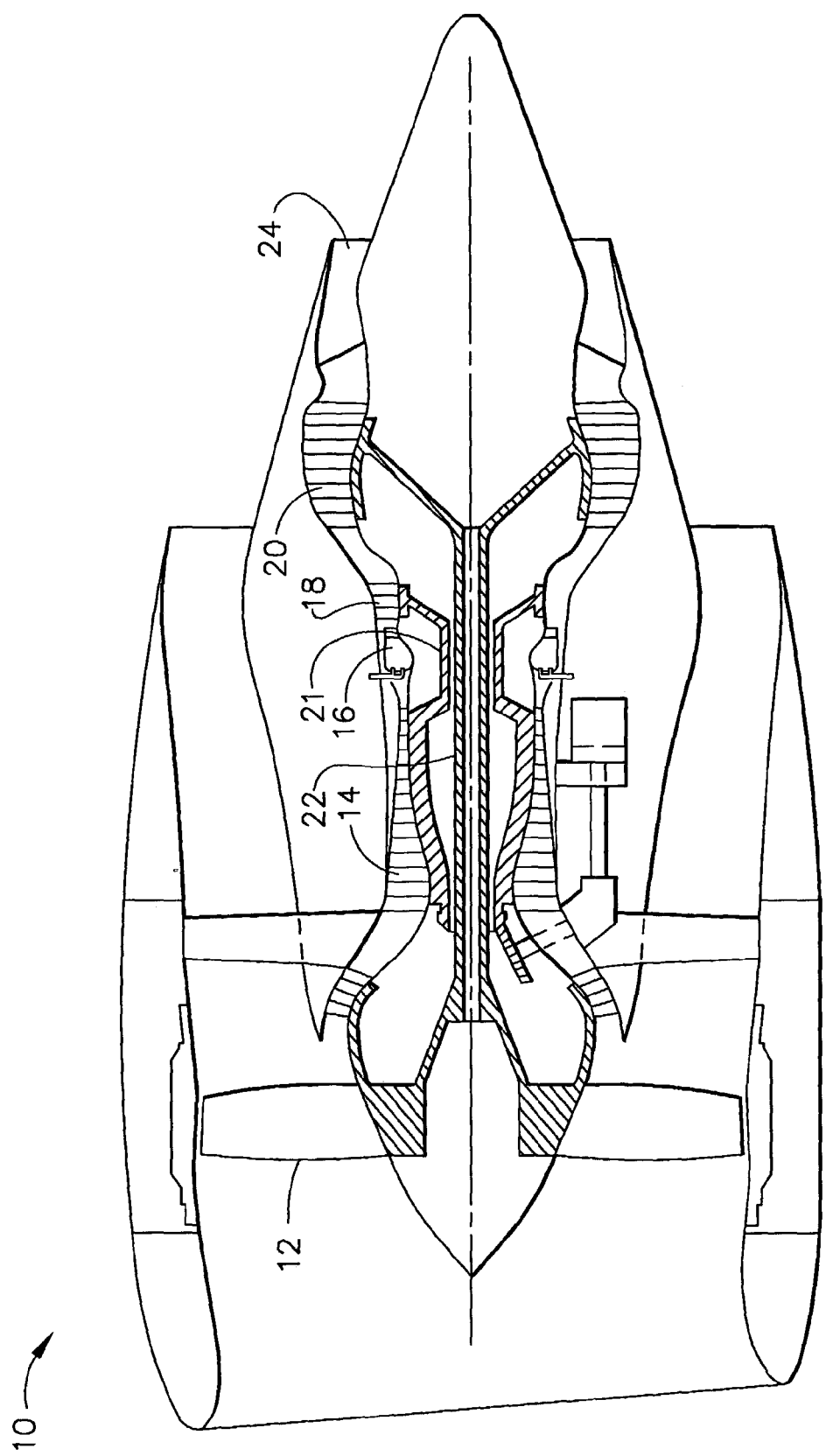
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21.

In operation, air flows through low pressure compressor 12 and compressed air is supplied from low pressure compressor 12 to high pressure compressor 14. The highly compressed air is delivered to combustor 16. Airflow from combustor 16 exits combustor 16 and drives turbines 18 and 20, and then exits gas turbine engine 10.

Figure 2:
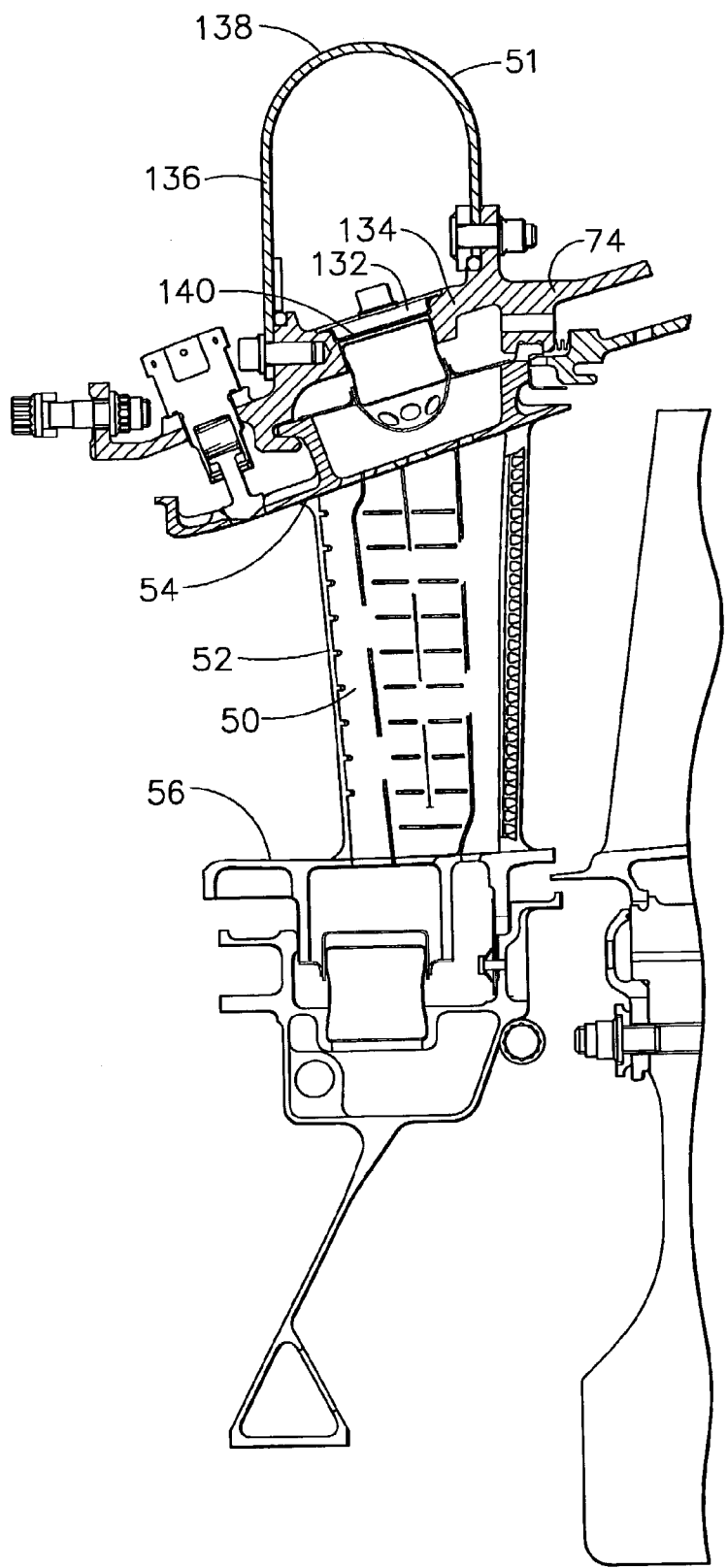
FIG. 2 is a perspective view of an exemplary turbine nozzle that may be used with the gas turbine engine shown in FIG. 1.
Figure 3:
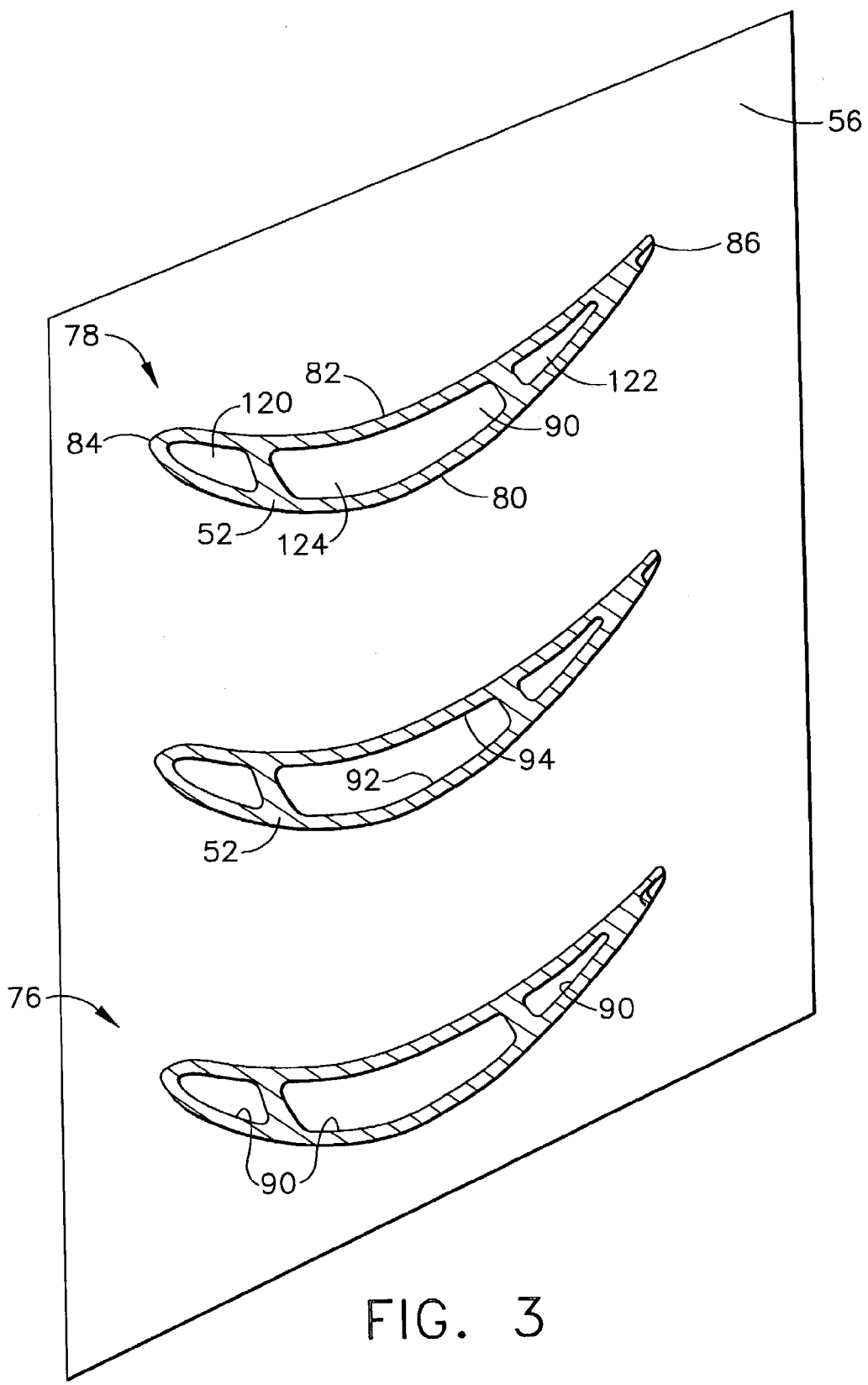
FIG. 3 is a cross-sectional view through a plurality of nozzle vanes that may be used with the turbine nozzle shown in FIG. 2.
Figure 4:
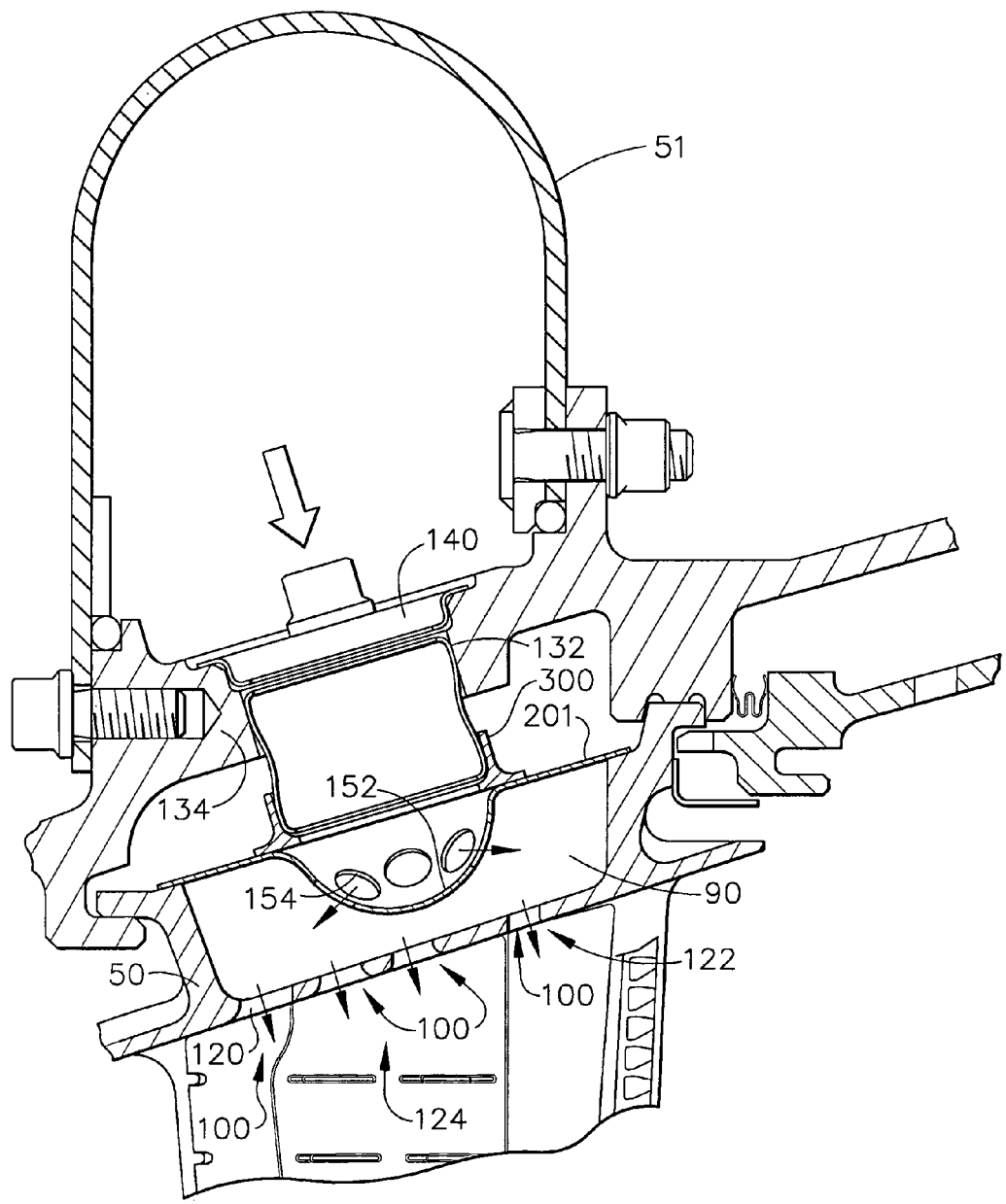
FIG. 4 is an enlarged side cross-sectional view of a distribution port that may be used with a manifold ring shown in FIG. 2 to supply cooling fluid to the turbine nozzle shown in FIG. 2.

FIG. 2 is a perspective view of an exemplary known turbine nozzle 50 including a manifold ring 51 that may be used with a gas turbine engine, such as gas turbine engine 10. FIG. 3 is a cross-sectional view through nozzle 50. FIG. 4 is an enlarged side cross-sectional view of a distribution port 140 that may be used to supply cooling fluid to turbine nozzle 50. In the exemplary embodiment, nozzle 50 includes a plurality of circumferentially-spaced airfoil vanes 52 coupled together by an arcuate radially outer band or platform 54, and an arcuate radially inner band or platform 56. More specifically, in the exemplary embodiment, each band 54 and 56 is integrally-formed with airfoil vanes 52, and nozzle 50 includes at least one airfoil vane 52. Alternatively, nozzle 50 includes a plurality of vanes 52.

In the exemplary embodiment, airfoil vanes 52 are substantially identical and each nozzle includes a leading airfoil vane 76 and a trailing airfoil vane 78. Each individual vane 52 includes a first sidewall 80 and a second sidewall 82. First sidewall 80 is convex and defines a suction side of each airfoil vane 52, and second sidewall 82 is concave and defines a pressure side of each airfoil vane 52. Sidewalls 80 and 82 are joined at a leading edge 84 and at an axially-spaced trailing edge 86 of each airfoil vane 52. More specifically, each airfoil trailing edge 86 is spaced chordwise and downstream from each respective airfoil leading edge 84.

First and second sidewalls 80 and 82, respectively, extend longitudinally, or radially outwardly, in span from radially inner band 56 to radially outer band 54. Additionally, first and second sidewalls 80 and 82, respectively, define a cavity 90 within each airfoil vane 52 for cooling thereof. More specifically, cavity 90 is bounded by an inner surface 92 and 94 of each respective airfoil sidewall, and extends through each band 54 and 56.

Each airfoil vane cavity 90 is coupled to a plurality of cooling passages 100 defined therein. More specifically, in the exemplary embodiment, passages 100 include a leading edge cooling passage 120, a trailing edge cooling passage 122, and a center cooling passage 124 that extends therebetween.

Manifold ring 51 is annular and extends circumferentially within engine 10, such that manifold ring 51 is radially outward from turbine nozzles 50. Specifically, manifold ring 51 connects to casing 74, and channels cooling air to each distribution port 140. Each port 140 is generally centered with respect to, and radially outward from, each turbine nozzle outer band 54. Manifold ring 51 is hollow and includes a radially outer end 138 and a radially inner wall 134 coupled together by a pair of radial sidewalls 136.

Manifold ring 51 includes a plurality of circumferentially spaced distribution ports 140 that extend radially inward. As is known in the art, each distribution port 140 is coupled to a cooling source that provides cooling fluid for cooling of nozzles 50. In one embodiment, each port 140 receives cooling air from a compressor, such as compressor 14 (shown in FIG. 1).

Within each distribution port 140 is a tube 132, known as a spoolie, that is substantially centered and extends radially inward, to connect with a manifold port 300. More specifically, in the exemplary embodiment, each spoolie 132 is positioned at least partially radially between each distribution port 140 and manifold port 300, and extends between each port 140 and nozzle manifold port 300. Each manifold port 300 is also connected to a cover plate 201 which is coupled to radial outer faces of nozzle 50. More specifically, cover plate 201 extends across nozzle 50 and includes a contoured bottom surface 152 that facilitates directing cooling fluid into nozzle 50. In the exemplary embodiment, cover plate bottom surface 152 is substantially semi-spherical.

A plurality of cooling openings 154 extend through bottom 152. More specifically, in the exemplary embodiment, openings 154 are identically sized and are spaced axially and circumferentially across cover plate 201. Openings 154 control the flow of cooling fluid from manifold port 300. More specifically, as described in more detail below, the size and relative location of openings 154 is variably selected to facilitate providing a substantially even flow distribution of cooling fluid to airfoil vane cavity cooling passages 100.

During operation, as hot combustion gases flow through nozzles 50, an operating temperature of nozzles 50 is increased. Cooling fluid supplied to cooling manifold ring 51 is circulated in a circumferential direction before being channeled radially inwardly into distribution port 140. The cooling fluid is then forced radially inwardly through distribution port 140 towards spoolie 132, wherein the fluid is channeled into manifold port 300. The cooling fluid is then discharged towards cover plate 201 wherein because cooling plate bottom 152 contoured radially inward towards nozzles 50, rather than being substantially planar, airflow impinging on port bottom 152 is not reflected in a reverse effect such that airflow buffeting is generated within port 140. Rather, the contour of bottom 152 facilitates improving the air flow distribution supplied to nozzle airfoil cavity 90.

Figure 5:
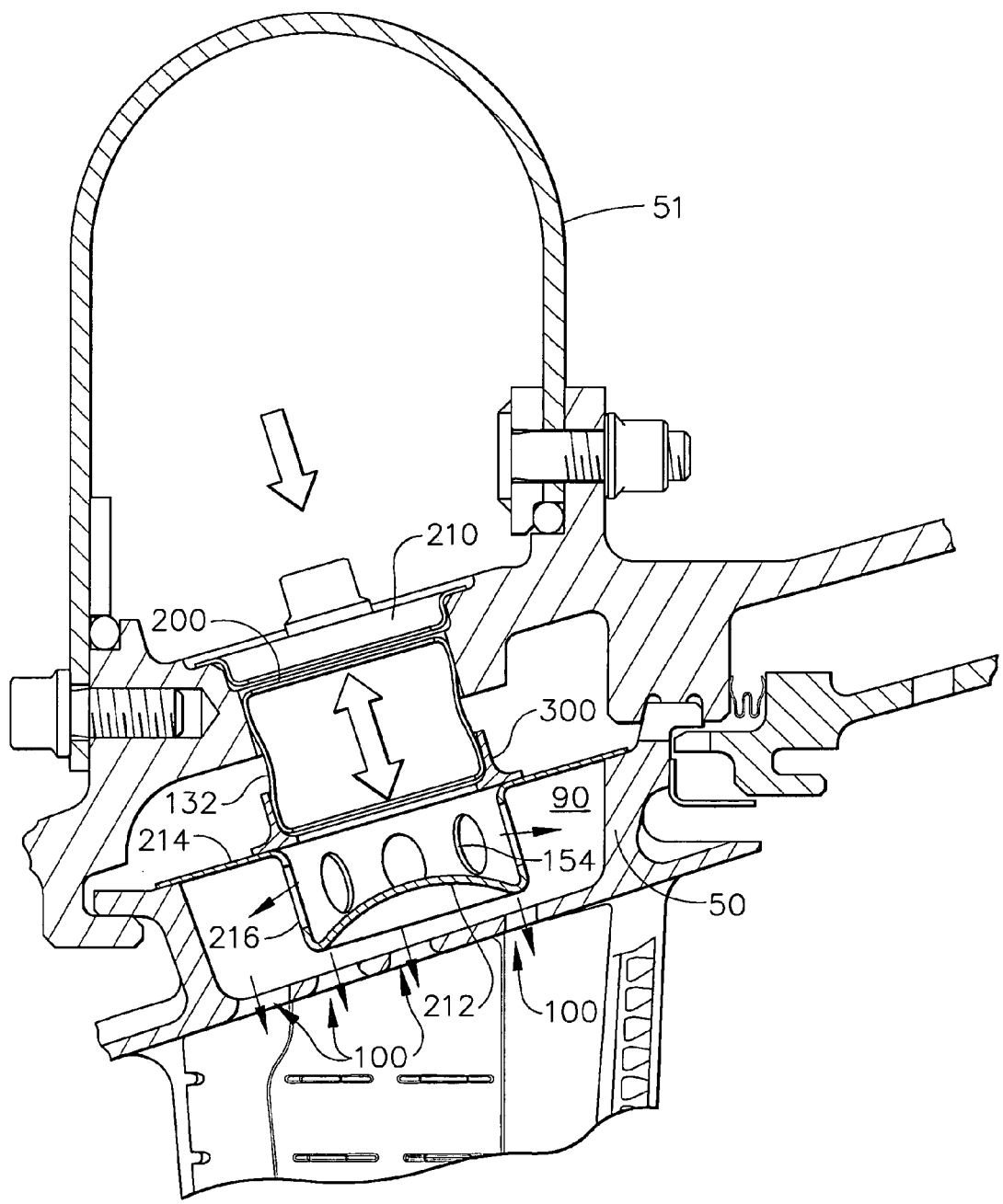
FIG. 5 is an enlarged side cross-sectional view of an alternative embodiment of a distribution port that may be used to supply cooling fluid to a turbine nozzle, such as the turbine nozzle shown in FIG. 2.

FIG. 5 is an enlarged side cross-sectional view of an alternative embodiment of a distribution port 200 that may be used to supply cooling fluid to a turbine nozzle, such as the turbine nozzle 50 (shown in FIG. 2). Cooling distribution port 200 is substantially similar to distribution port 140 shown in FIG. 4, and components in distribution port 200 that are identical to components of cooling distribution port 140 are identified in FIG. 5 using the same reference numerals used in FIG. 4. Accordingly, distribution port 200 is substantially circular and extends radially from manifold ring 51.

Distribution port 200 also includes a plurality of circumferentially-spaced distribution ports 210 that extend radially inward to connect with spoolie 132 which is coupled to manifold port 300. Manifold port 300 is coupled to a cover plate 214 which extends across nozzle 50 and includes a contoured inlet, which in the exemplary embodiment, is a dimpled contoured bottom 212. Because bottom 212 is contoured, rather than planar, bottom 212 facilitates directing cooling fluid into nozzle 50. More specifically, in the exemplary embodiment, each distribution port 200 is substantially centered with respect to, and radially outward from, each turbine nozzle 50, such that each port 200 is at least partially positioned axially within each segment. As is known in the art, distribution port 200 is coupled to a cooling source that provides cooling fluid to nozzles 50. In one embodiment, port 200 receives cooling air from a compressor, such as compressor 14 (shown in FIG. 1).

Each distribution port 200 is substantially circular and is coupled to spoolie 132 and manifold port 300. In the exemplary embodiment, bottom 212 is formed integrally with cover plate 214, and extends arcuately across nozzle 50. More specifically, bottom 212 is contoured or bows radially outwardly away from nozzles 50 and towards distribution port 200. Additionally, in the exemplary embodiment, sidewalls 216 extend substantially perpendicularly from cover plate 214. In an alternative embodiment, sidewalls 216 are not oriented substantially perpendicular with respect to cover plate 214.

A plurality of cooling openings 154 extend through sidewall 216. More specifically, in the exemplary embodiment, openings 154 are identically sized and are spaced axially and circumferentially across distribution port 200. Openings 154 control the flow of cooling fluid from distribution port 200 into each airfoil vane cavity 90. More specifically, the size and relative location of openings 154 is variably selected to facilitate providing a substantially even flow distribution of cooling fluid to airfoil vane cavity cooling passages 100

The above-described turbine nozzle includes a plurality of circumferentially-spaced distribution ports that extend radially inwardly from the manifold ring towards each turbine nozzle. More specifically, each distribution port includes a radially inner surface or bottom portion that extends across the port between the sidewalls. Because the bottom portion is arcuately contoured between the sidewalls, cooling fluid impinging on the bottom portion is not reflected radially outwardly to generate buffeting within the distribution. Rather, the arcuate surface facilitates reducing the velocity of the cooling fluid such that pressure losses associated with the cooling fluid turning through the distribution port openings are facilitated to be reduced in comparison to known distribution ports that include substantially planar radially inner surfaces. As a result, cooling fluid is supplied to the turbine nozzle in a flow distribution pattern that enables each cooling passage defined within the turbine nozzle airfoil vanes to receive approximately the same volume of cooling fluid. Accordingly, the turbine nozzle airfoil vanes are operable at a reduced operating temperature, which facilitates extending the durability and useful life of the turbine nozzles.

Exemplary embodiments of turbine nozzles are described above in detail. The nozzles are not limited to the specific embodiments described herein, but rather, components of each turbine nozzle may be utilized independently and separately from other components described herein.

While the invention has been described in terms of various specific embodiments, those skilled in the art will recognize that the invention can be practiced with modification within the spirit and scope of the claims.

What is claimed is:

1. A method for operating a gas turbine engine, said method comprising:
    supplying cooling fluid into a manifold ring that includes a plurality of distribution ports and a radially inner wall that extends arcuately across at least one turbine nozzle positioned radially inward from the manifold ring;
    channeling the cooling fluid circumferentially through the manifold ring and through at least one distribution port of the plurality of distribution ports; and
    channeling cooling fluid discharged from the at least one distribution port radially inwardly through a plurality of openings defined within the radially inner wall and into an airfoil vane cavity of the at least one turbine nozzle such that flow distribution into the airfoil vane cavity is substantially uniform.

2. A method in accordance with claim 1 wherein at least a portion of said radially inner wall is contoured radially inward towards the at least one turbine nozzle.

3. A method in accordance with claim 1 wherein at least a portion of said radially inner wall is contoured radially outward from the at least one turbine nozzle.

4. A method in accordance with claim 1 wherein channeling the cooling fluid circumferentially through the manifold ring and through at least one distribution port further comprises channeling the cooling fluid through a plurality of circumferentially-spaced substantially circular distribution ports that extend radially inward towards a plurality of turbine nozzles.

5. A turbine nozzle assembly for a gas turbine engine, said nozzle assembly comprising:
    a turbine nozzle comprising an outer band, an inner band, and plurality of airfoil vanes coupled together by said outer and inner bands, each said airfoil vane is hollow and defines a cavity therein; and
    a manifold ring extending circumferentially around said turbine nozzle for channeling cooling fluid radially inwardly into each said airfoil vane cavity, said manifold ring comprising at least one distribution port and a radially inner wall at least a portion of that extends arcuately across said turbine nozzle, wherein said manifold ring facilitates enhancing cooling fluid flow distribution into said turbine nozzle airfoil vane cavity.

6. A turbine nozzle assembly in accordance with claim 5 wherein at least a portion of said radially inner wall is contoured radially inward towards each said turbine nozzle cavity.

7. A turbine nozzle assembly in accordance with claim 5 wherein at least a portion of said radially inner wall is contoured radially outward away from each said turbine nozzle cavity.

8. A turbine nozzle assembly in accordance with claim 5 wherein said manifold ring is hollow and defines a cavity therein, said radially inner wall comprises a bottom coupled together by a pair of sidewalls and a plurality of openings extending through at least one of said pair of sidewalls and said bottom, at least a portion of said bottom extends arcuately across said turbine nozzle, and said plurality of openings are in flow communication with said manifold ring cavity for discharging cooling fluid therefrom.

9. A turbine nozzle assembly in accordance with claim 8 wherein said turbine nozzle airfoil vane cavity contains a plurality of cooling passages defined therein, and said plurality of openings extending through at least one of said pair of sidewalls and said bottom are in flow communication with said plurality of cooling passages.

10. A turbine nozzle assembly in accordance with claim 5 wherein said radially inner wall further comprises a plurality of circumferentially-spaced substantially spherical projections extending radially inward towards each said turbine nozzle airfoil vane cavity.

11. A gas turbine engine comprising a turbine nozzle assembly comprising at least one turbine nozzle and a manifold ring, said at least one turbine nozzle comprising an outer band, an inner band, and plurality of airfoil vanes coupled together by said outer and inner bands, each of said airfoil vanes is hollow and defines a cavity therein, said manifold ring extends circumferentially within said gas turbine engine and is radially outward from said at least one turbine nozzle for channeling cooling fluid radially inward into each said airfoil vane cavity, said manifold ring comprises at least one distribution port and a radially inner wall that extends arcuately across said at least one turbine nozzle.

12. A gas turbine engine in accordance with claim 11 wherein said manifold ring is hollow and defines a cavity therein, said radially inner wall comprises a plurality of openings extending therethrough, and said plurality of openings are in flow communication with said manifold ring cavity.

13. A gas turbine engine in accordance with claim 12 wherein each said vane cavity contains a plurality of cooling passages defined therein, and said plurality of openings within said radially inner wall are in flow communication with said plurality of cooling passages.

14. A gas turbine engine in accordance with claim 12 wherein at least a portion of said radially inner wall is contoured radially inwardly towards each said turbine nozzle airfoil vane cavity.

15. A gas turbine engine in accordance with claim 12 wherein at least a portion of said radially inner wall is contoured radially outwardly away from said turbine nozzle airfoil vane cavity.

16. A gas turbine engine in accordance with claim 12 wherein said manifold ring facilitates enhancing cooling fluid flow distribution into each said turbine nozzle airfoil vane cavity.

17. A gas turbine engine in accordance with claim 12 wherein said manifold ring further comprises a plurality of substantially circular distribution ports extending radially inward towards each said turbine nozzle airfoil vane cavities.

* * * * *